United States Patent
Mahajan et al.

(10) Patent No.: US 11,023,270 B2
(45) Date of Patent: Jun. 1, 2021

(54) CONFIGURATION OF DECOUPLED UPGRADES FOR CONTAINER-ORCHESTRATION SYSTEM-BASED SERVICES

(71) Applicant: SAP SE, Walldorf (DE)

(72) Inventors: Sushant Mahajan, New Delhi (IN); Aniruddha Kulkarni, Bangalore (IN)

(73) Assignee: SAP SE, Walldorf (DE)

( * ) Notice: Subject to any disclaimer, the term of this patent is extended or adjusted under 35 U.S.C. 154(b) by 39 days.

(21) Appl. No.: 16/547,943

(22) Filed: Aug. 22, 2019

(65) Prior Publication Data

US 2021/0055947 A1 Feb. 25, 2021

(51) Int. Cl.
  *G06F 8/65* (2018.01)
  *G06F 9/455* (2018.01)
  *G06F 9/50* (2006.01)
  *G06F 16/901* (2019.01)

(52) U.S. Cl.
  CPC .......... *G06F 9/45558* (2013.01); *G06F 8/65* (2013.01); *G06F 9/5077* (2013.01); *G06F 16/9027* (2019.01); *G06F 2009/45595* (2013.01)

(58) Field of Classification Search
  CPC .... G06F 8/65; G06F 16/9027; G06F 9/45558; G06F 9/5077; G06F 2009/45595
  See application file for complete search history.

(56) References Cited

U.S. PATENT DOCUMENTS

| | | | | |
|---|---|---|---|---|
| 10,404,474 B1 * | 9/2019 | Caceres | ................. | H04L 9/3263 |
| 10,489,138 B1 * | 11/2019 | Wu | .......................... | H04L 41/08 |
| 2017/0371639 A1 * | 12/2017 | Simek | ..................... | H04L 67/42 |
| 2020/0241865 A1 * | 7/2020 | Phong | ........................ | G06F 8/65 |
| 2020/0334025 A1 * | 10/2020 | Wang | ..................... | H04L 67/34 |
| 2021/0026614 A1 * | 1/2021 | Manoharan | ............... | G06F 8/61 |

OTHER PUBLICATIONS

Wikipedia, "Breadth-first search", https://en.wikipedia.org/wiki/Breadth-first_search, Internet Archive dated Aug. 20, 2018.*

* cited by examiner

*Primary Examiner* — Doon Y Chow
*Assistant Examiner* — Timothy P Duncan
(74) *Attorney, Agent, or Firm* — Buckley, Maschoff & Talwalkar LLC (57) ABSTRACT

Some embodiments provide a system and method associated with a determination of an upgrade path for an application service associated with a container-orchestration system (e.g., a KUBERNETES® container-orchestration system). A container-orchestration system server may trigger, by an operator object deployed as a controller for the application service, an upgrade process. In response to the trigger, the container-orchestration system server may access a dictionary type data structure containing a plurality of tuples associated with the application service (and the dictionary type data structure may be uncoupled from the application service). The container-orchestration system server may then automatically execute a search algorithm on the plurality of tuples to determine the upgrade path from a source version to a target version for the application service. According to some embodiments, the application service may then be automatically upgraded in accordance with the determined upgrade path.

13 Claims, 10 Drawing Sheets

CONFIGURATION OF DECOUPLED UPGRADES FOR CONTAINER-ORCHESTRATION SYSTEM-BASED SERVICES

FIELD

Some embodiments are associated with container-orchestration systems. In particular, some embodiments provide improved upgrade path determinations for container-orchestration system-based services.

BACKGROUND

A service on a container-orchestration system (e.g., a backing and/or application service) is typically implemented as a pair of two objects. One is the operator which instructs the Application Programming Interface ("API") server to create appropriate resources on the infrastructure where an application service is deployed and the other is the service itself (which may be, for example, a combination of containers and built-in service objects). The operator may capture and encode a human operator's know-how and therefore contains the logic for provisioning, deprovisioning, handling updates, etc. for the service. Consider an example where a database service is associated with corresponding operator. Periodically, the system may need to update the service for various reasons, such as code changes or a database version change.

Note that database versions might not always be compatible with previous versions, and additional steps may be required to complete the upgrade process. This information could be hard-coded in the operator code, but such an approach may not be desirable because it can change with every version. For some source and target version situations, only a deployment of a new image may be required. In other situations, however, an upgrade procedure may need to be performed and/or an intermediate version upgrade may be required. Manually determining an appropriate upgrade path can be a manual, time-consuming, and error prone process—especially when there are a substantial number of services, potential upgrade steps, etc. It may therefore be desirable to provide systems and methods to automatically determine an upgrade path for an application service associated with a container-orchestration system in an accurate and efficient manner.

SUMMARY OF THE INVENTION

According to some embodiments, systems, methods, apparatus, computer program code and means are provided to determine an upgrade path for an application service associated with a container-orchestration system (e.g., a KUBERNETES® container-orchestration system available from the Linux Foundation). A container-orchestration system server may trigger, by an operator object deployed as a controller for the application service, an upgrade process. In response to the trigger, the container-orchestration system server may access a dictionary type data structure containing a plurality of tuples associated with the application service (and the dictionary type data structure may be uncoupled from the application service). The container-orchestration system server may then automatically execute a search algorithm on the plurality of tuples to determine the upgrade path from a source version to a target version for the application service. According to some embodiments, the application service may then be automatically upgraded in accordance with the determined upgrade path.

Some embodiments comprise: means for triggering, by a container-orchestration system server in connection with an operator object deployed as a controller for an application service, an upgrade process; in response to the trigger, means for accessing a dictionary type data structure containing a plurality of tuples associated with the application service, wherein the dictionary type data structure is uncoupled from the application service; means for automatically executing a search algorithm on the plurality of tuples to determine the upgrade path from a source version to a target version for the application service; and means for automatically upgrading the application service in accordance with the determined upgrade path.

In some embodiments, a communication device associated with exchanges information in connection with one or more distributed communication networks and/or interactive graphical user interfaces. The information may be exchanged, for example, via public and/or proprietary communication networks.

Technical effects of some embodiments of the invention are improved and computerized ways to automatically determine an upgrade path for an application service associated with a container-orchestration system in an accurate and efficient manner. With these and other advantages and features that will become hereinafter apparent, a more complete understanding of the nature of the invention can be obtained by referring to the following detailed description and to the associated drawings appended hereto.

DETAILED DESCRIPTION

The following description is provided to enable any person in the art to make and use the described embodiments and sets forth the best mode contemplated for carrying out some embodiments. Various modifications, however, will remain readily apparent to those in the art.

Figure 1:
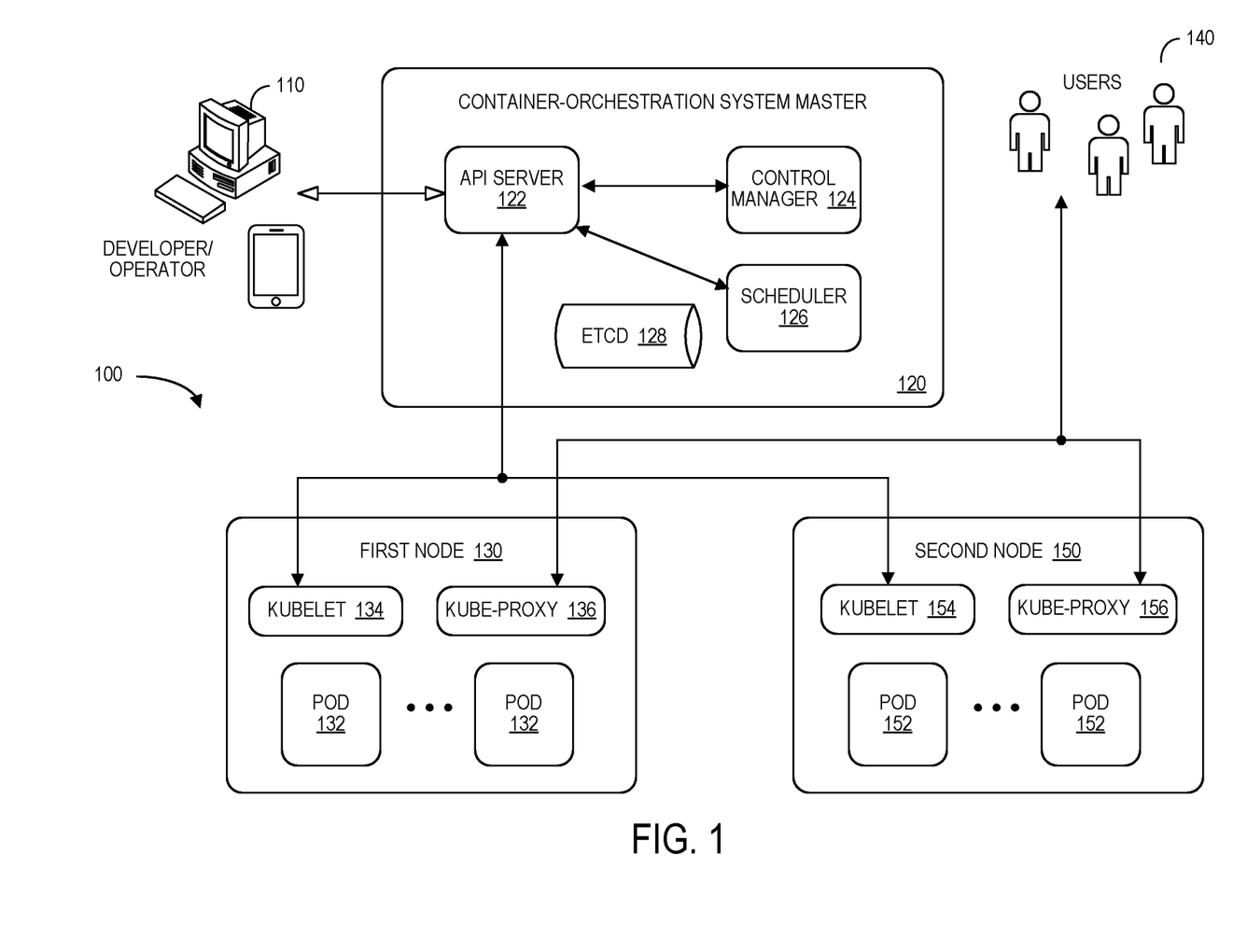
FIG. 1 illustrates a container-orchestration system in accordance with some embodiments.

Embodiments may be associated with a container-orchestration system. For example, FIG. 1 illustrates a container-orchestration system 100 in accordance with some embodiments. The system 100 includes a container-orchestration system master 120 that may be associated with a controlling unit of a cluster, managing the workload and directing communication across the system 100. The master 120 includes storage 128 that is often associated with an "/etc"

directory ("etcd") that may be fully replicated, highly available, consistent, simple, and secure. For example, the etcd 128 might comprise a persistent, lightweight, distributed, key-value data store the configuration data of the cluster. The master 120 may also include an API server 122 that communicates with developer/operator devices 110 to provide an internal and/or external interfac to a container-orchestration system such as KUBERNETES®. The API server 122 may process and validate Representational State Transfer ("REST") requests and update the state of the API objects in etcd 128. The master 120 may further include a scheduler 126 (e.g., a pluggable component that selects a node for an unscheduled pod based on resource availability) and a control manager 124 reconciliation loop that drives an actual cluster state toward a desired cluster state, communicating with the API server 122 to create, update, and delete managed resources (pods, service endpoints, etc.).

The system 100 may further include nodes 130, 150 (also referred to as "workers" or "minions"). For example, a first node 130 may include multiple pods 132 representing machines where containers are deployed (and each pod might be associated with one or more containers). The first node 130 may also include a Kubelet 134 the runs the state of the node 130, ensuring that all containers on the node 130 are healthy (e.g., it may start, stop, and/or maintain application containers organized into pods as directed by the master 120). According to some embodiments, each node 130, 150 may also include a Kube-proxy and/or load balancer that supports the service abstraction along with other networking operation in connection with users. That that containers reside inside the pods 134, 154. The container is the lowest level of a microservice that holds the running application, libraries, and/or dependencies.

Figure 2:
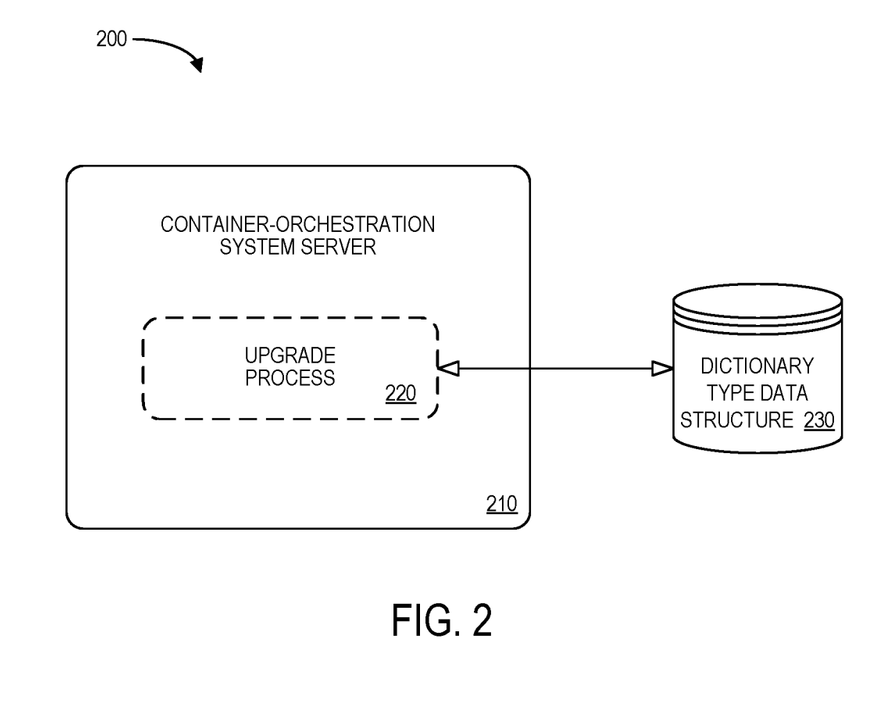
FIG. 2 is a block diagram of an upgrade path determination system according to some embodiments.

FIG. 2 is a block diagram of a resilience improvement system 200 according to some embodiments. In particular, the system 200 includes a container-orchestration system server 210 that executes an upgrade process 220. The container-orchestration system server 210 may, according to some embodiments, automatically determine an appropriate upgrade path for an application service. As used herein the term "automatically" may refer to a process that is performed with little or no human intervention. The container-orchestration system server 210 might be, for example, associated with a Personal Computers ("PC"), laptop computer, an enterprise server, a server farm, and/or a database or similar storage devices.

As used herein, devices, including those associated with the container-orchestration system server 210 and any other device described herein, may exchange information via any communication network which may be one or more of a telephone network, a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The container-orchestration system server 210 may store information into and/or retrieve information from databases, such as a dictionary type data structure 230. The databases might be, for example, locally stored relational database or reside physically remote from the container-orchestration system server 210. The term "relational" may refer to, for example, a collection of data items organized as a set of formally described tables from which data can be accessed. Moreover, a Relational Database Management System ("RDBMS") may be used in connection with any of the database tables described herein. According to some embodiments, a graphical operator interface may provide an ability to access and/or modify elements of the system 200 via remote devices. The operator interface might, for example, let an operator or administrator review upgrade histories or errors, initiate or pause an upgrade process, etc.

Note that any number of container-orchestration system servers 210 could be included in the system 200. Moreover, various devices described herein might be combined according to embodiments of the present invention. For example, in some embodiments, the container-orchestration system server 210 and an operator/administrator workstation might be co-located and/or may comprise a single apparatus. Moreover, the functions described herein might be implemented in a cloud-based environment and/or by a service provider (e.g., performing services for one or more enterprises, departments, or businesses).

Figure 3:
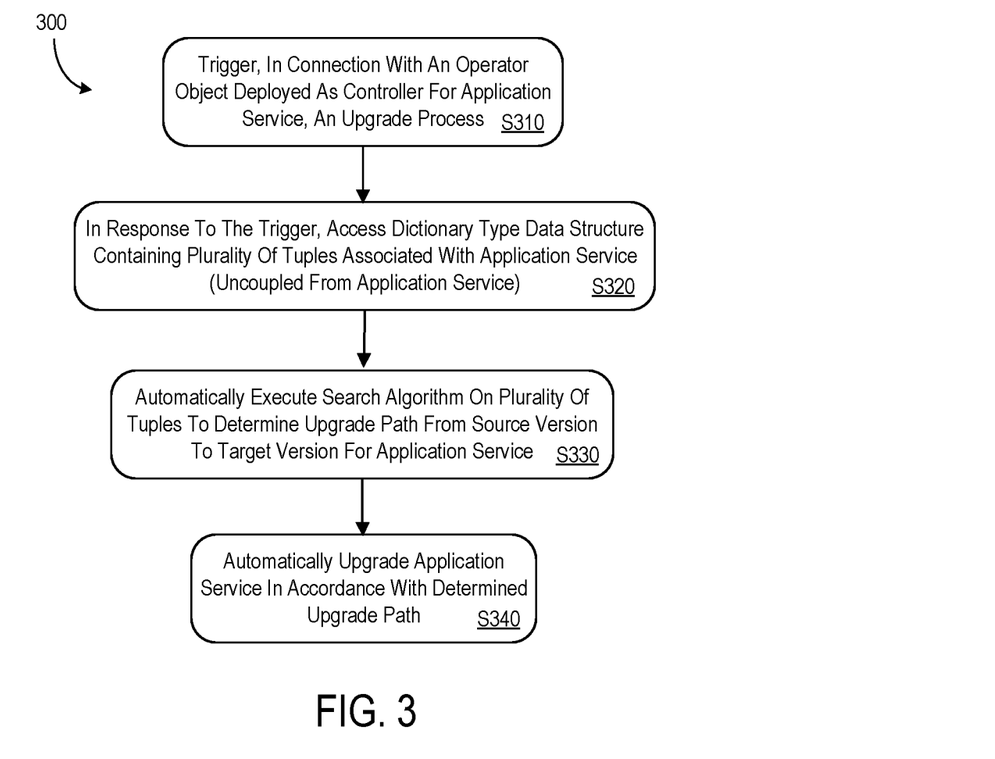
FIG. 3 illustrates an upgrade path determination method according to some embodiments.

FIG. 3 illustrates a resilience improvement method 300 that might be performed by some or all of the elements of the system 200 described with respect to FIG. 2, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

Figure 4:
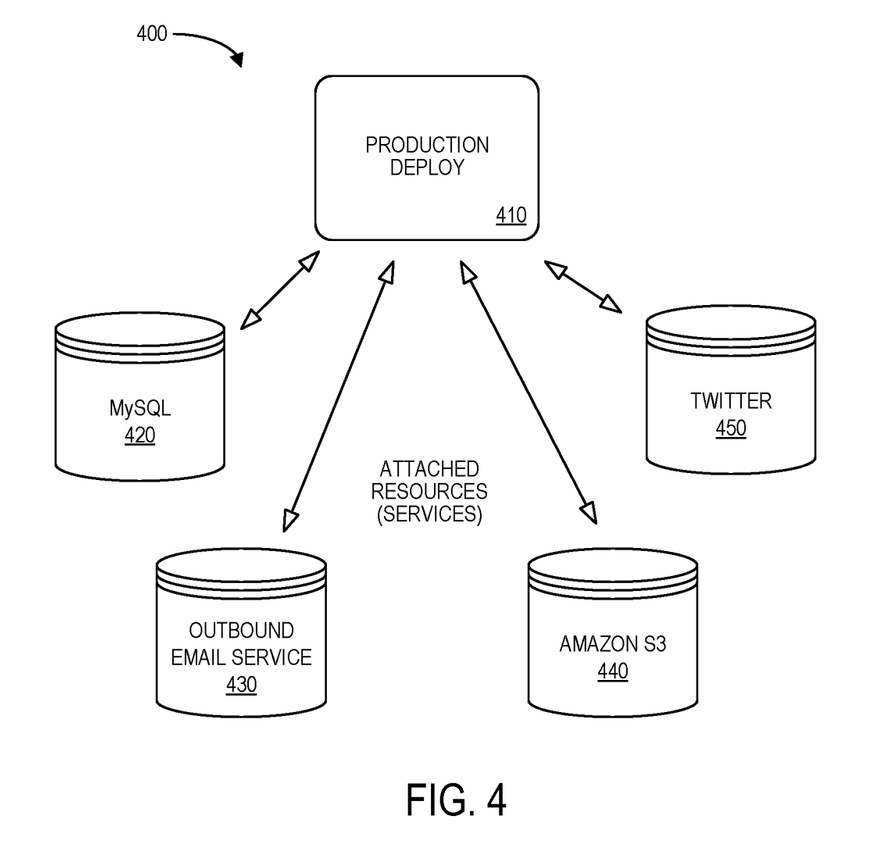
FIG. 4 illustrates backing services in accordance with some embodiments.

The method 300 may determine an upgrade path for an application associated with a container-orchestration system. The container-orchestration system might comprise, for example, a KUBERNETES® system. At S310, an operator object deployed as a controller for an application service may trigger an upgrade process. According to some embodiments, the application service is associated with a backing service instance. For example, the application service or backing service instance might be associated with a database service, an outbound email service, a Simple Storage Service ("S3"), a social networking service, etc. FIG. 4 illustrates 400 backing services in accordance with some embodiments. As used herein, the phrase "backing service" might refer to any service an application consumes over a network as part of normal operation. The illustration 400 of FIG. 4 includes a production deployment 410 attached to four resources (e.g., application and/or backing services): MySQL 420, an outbound email service 430, an Amazon S3 440, and twitter 450. Note that services (like a database service) might be managed by the systems administrator who deployed the application's runtime or a third-party.

Referring again to FIG. 3, in response to the trigger the system may access a dictionary type data structure containing a plurality of tuples associated with the application service at S320. Note that the dictionary type data structure may be uncoupled from the application service. According to some embodiments, the container-orchestration system is a KUBERNETES®-based backing service and the application service is associated with a volume mounted within a container (e.g., the operator object and an associated service object). For example, the dictionary type data structure might be a configmap within the volume.

At S330, the system may automatically execute a search algorithm on the plurality of tuples to determine an upgrade path from a source version to a target version for the application service. According to some embodiments, each tuple in a configmap comprises a target version identifier and a Boolean indicating if an additional task needs to be performed in connection with the upgrade process. According to some embodiments, the configmap defines a tree data structure and the algorithm search comprises a breadth-first search algorithm, such as the ones described with respect to FIGS. 5 and 6. At S340, the system may automatically upgrade the application service in accordance with the determined upgrade path (e.g., to a new, target version number).

In this way, embodiments may provide a method to configure decoupled upgrades for KUBERNETES®-based backing services. According some embodiments, three entities may be associated with this approach:

1. operator: An object deployed on KUBERNETES® which serves as a controller for our service. It is this entity which communicates with the API server. According to some embodiments, the operator is responsible for triggering an update.

2. configmap: A dictionary type data structure provided by KUBERNETES® which can be used to store key value pairs.

3. Backing service instance: A combination of containers and KUBERNETES® services.

Note that it may not be desirable to hard code the upgrade path in the operator since it is a one-time operation per service instance. Moreover, such an approach may pollute the code with a lot of version information. In addition, the operator may need to be redeployed whenever new version information and/or path is created. As backing service instances move to more advanced versions, there is also a good chance that the upgrade path information in the source code for earlier versions will become "dead code."

The upgrade information should also not reside within the actual service, since these are just containers and it is not known beforehand what the next upgrade version will be. In addition, the upgrade information would involve communication with the KUBERNETES® API server (which should be kept to minimum in a service because the operator should handle such exchanges of information).

To avoid such problems, some embodiments described herein store the version upgrade information in a common configmap available to the operator for consultation to facilitate the performance of a version upgrade process. For example, a configmap may be initially created with the current version of the database or other application service (e.g., version "1.0"). This might be created, for example, when the operator is deployed. The key may comprise the version and value may comprise an empty array ("[ ]")

```
map={
    ver1.0 : [ ]
}
```

The system may then push a security update to the database as version "1.2." In this example, the update to version 1.2 does not require any additional steps to be taken to manipulate the data (only the database binary needs to be updated in the service). As a result, configmap will be updated as follows:

```
map={
    ver1.0 : [(1.2,0)]
}
```

The elements in the tuple are interpreted as:
1. a version to which it is possible to upgrade ("1.2"); and
2. a Boolean value indicating if any additional task needs to be performed (in this example, "0" indicates that no additional task is required and "1" indicates that an additional task does need to be performed for the upgrade).

The operator, using the configmap, may then spawn a job using an image coded to version number 1.2 and update the backing service instance as appropriate.

Now assume that the system needs to update the backing service to version 1.5. To upgrade instances still using version 1.0, an additional job needs to be performed but for instances using version 1.2, the update is straightforward. In this case, the following information may be added to the configmap:

```
map={
    ver1.0 : [(1.2,0), (1.5,1)],
    ver1.2 : [(1.5,0)]
}
```

Here, a Boolean value of "1" in the tuple indicates that an upgrade job is required. Based on the configmap, the operator will pull an appropriate image which has additional job code to update version 1 instances (while for those updated from version 1.2 no additional work needs to be performed).

Now consider a general case where the configmap is as follows:

```
map={
    ver1.0 : [(1.2,0), (1.4,0), (1.5,1)],
    ver1.2 : [(1.5, 0), (1.6, 1)],
    ver1.5 : [(1.6,0)]
}
```

In this example, assume that the source version is "1.0" and the upgrade target version is "1.6." To find an appropriate upgrade path, the system may use a Breadth-First-Search ("BFS") algorithm to determine the shortest path in order to reach the target version. When identified, the system may upgrade the service instance incrementally along that path. Note that this might comprise a multi-step affair. For the above example, two different appropriate paths would be: (a) from version 1.0 to (1.5, 1) to (1.6, 0), and (b) from version 1.0 to (1.2, 0) to (1.6, 1). For efficiency, all paths might be be checked and the one with lowest number of "1 s" as second tuple element (e.g., having the fewest additional tasks) can be selected.

Figure 5:
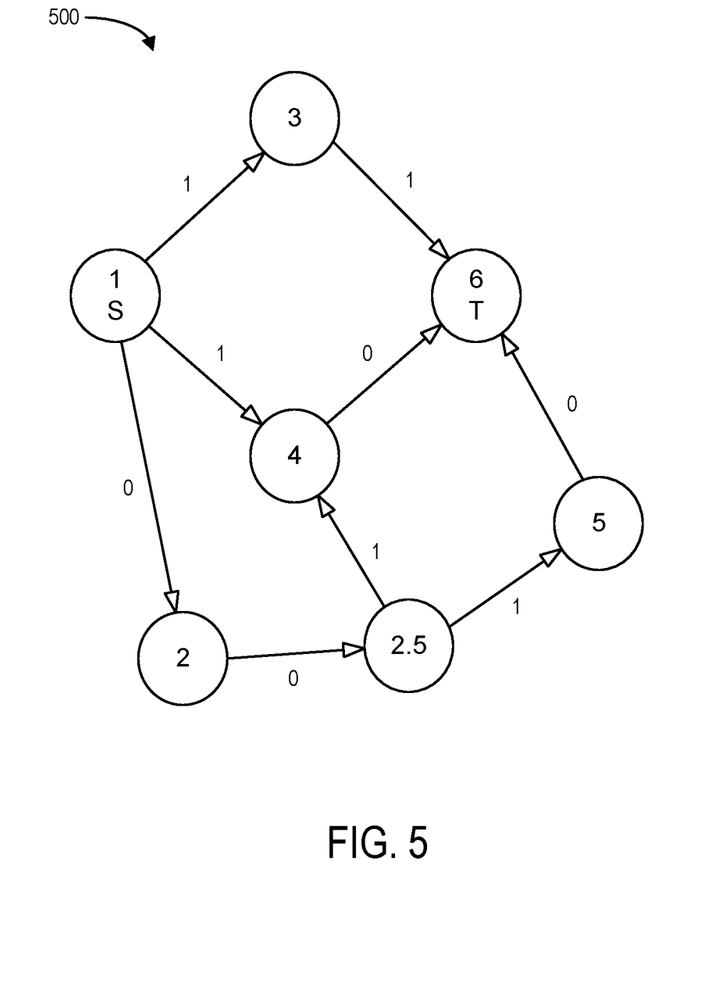
FIGS. 5 and 6 illustrate an upgrade path search algorithm according to some embodiments.
Figure 6:
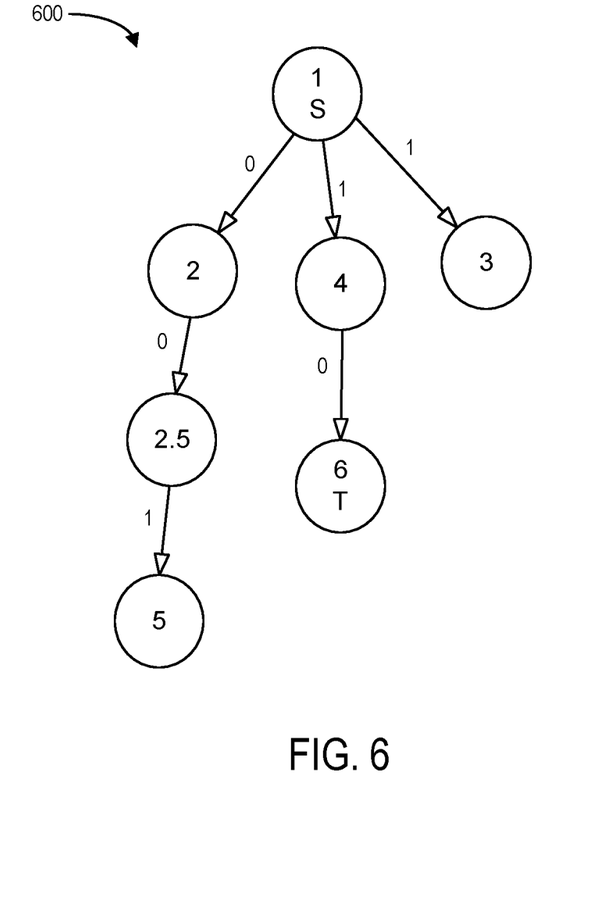

FIGS. 5 and 6 illustrate a search algorithm according to some embodiments. In particular, FIG. 5 illustrates 500 upgrade path possibilities (from a source version ("S") labeled "1" to a target version "T") labeled "6," and FIG. 6 illustrates 600 a standard implementation of BFS on a graph. Note that the approach may find the shortest path between the source and target versions (S and T) in the graph. The "1 s" and "0 s" on the graph edges indicate whether or not an extra upgrade task needs to be performed. In general, the BFS is an algorithm to traverse or search a graph (e.g., a tree data structure). The algorithm starts at the tree root (or some arbitrary node of a graph, sometimes referred to as a "search key") and explores all of the neighbor nodes at the present depth before moving to the nodes at the next depth level. Note that BFS uses the opposite strategy as compared to a depth-first search (which instead explores the highest-depth nodes first before being forced to backtrack and expand shallower nodes).

Figure 7:
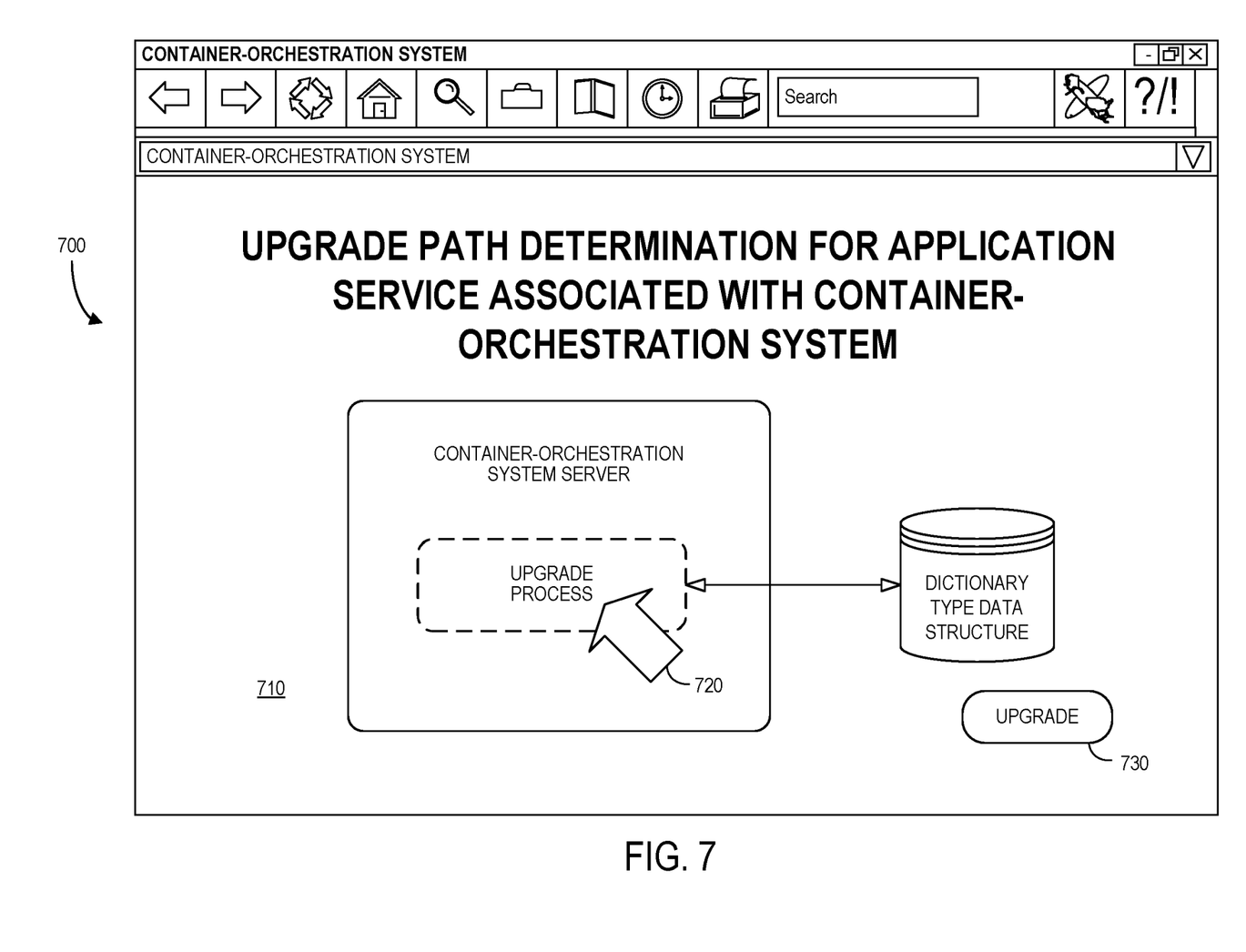
FIG. 7 is an upgrade path user interface display according to some embodiments.

In some cases, an operator or administrator may monitor and/or adjust parameters associated with embodiments described herein. For example, FIG. 7 illustrates an interactive Graphical User Interface ("GUI") display 700 that might display information about a system according to some embodiments. The display 700 includes a graphic representation 710 of elements of a system (e.g., a container orchestration system server, a configmap, etc.). Selection of portions of the graphic representation 710 (e.g., by touchscreen or computer mouse pointer 720) may result in the display of additional information about an element and/or allow an operator to adjust a parameter associated with the system. Similarly, selection of an "Upgrade" icon 730 may also let the user perform a software upgrade process for the container orchestration system (e.g., to see how various upgrade paths are evaluated, determine system performance parameters, etc.).

Figure 8:
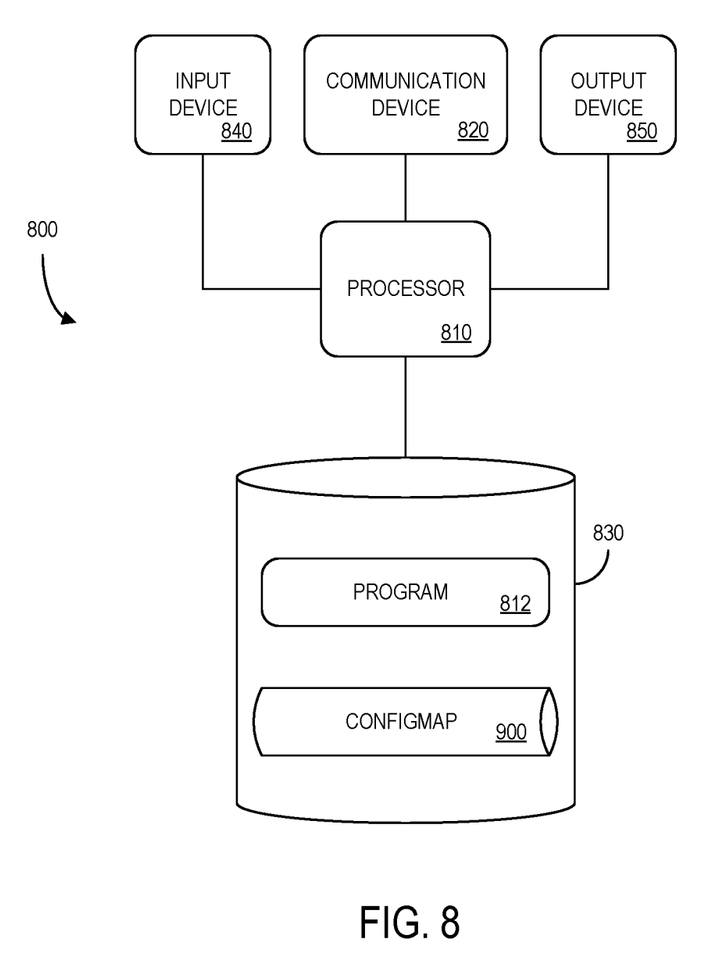
FIG. 8 is a high-level diagram of an apparatus or platform in accordance with some embodiments.

The embodiments described herein may be implemented using any of a number of different computer hardware implementations. FIG. 8 is a block diagram of apparatus 800 according to some embodiments (e.g., the system 200 of FIG. 2). The apparatus 800 may comprise a general-purpose computing apparatus and may execute program code to perform any of the functions described herein. The apparatus 800 may include other unshown elements according to some embodiments. According to some embodiments, the apparatus 800 includes a processor 810 operatively coupled to a communication device 820, a data storage device 830, one or more input devices 840, and/or one or more output devices 850. The communication device 820 may facilitate communication with external devices, such as remote user or administrator devices. The input device(s) 840 may comprise, for example, a keyboard, a keypad, a mouse or other pointing device, a microphone, knob or a switch, an Infra-Red ("IR") port, a docking station, and/or a touch screen. The input device(s) 840 may be used, for example, to enter information into the apparatus 800 (e.g., about upgrade rules or task, etc.). The output device(s) 850 may comprise, for example, a display (e.g., a display screen) a speaker, and/or a printer (e.g., to provide upgrade process status to an operator, summary analytic reports, troubleshooting information, etc.).

The data storage device 830 may comprise any appropriate persistent storage device, including combinations of magnetic storage devices (e.g., magnetic tape, hard disk drives and flash memory), optical storage devices, Read Only Memory ("ROM") devices, etc., while the memory 860 may comprise Random Access Memory ("RAM").

The program code 812 may be executed by the processor 810 to cause the apparatus 800 to perform any one or more of the processes described herein. Embodiments are not limited to execution of these processes by a single apparatus. The data storage device 830 may also store data and other program code for providing additional functionality and/or which are necessary for operation thereof, such as device drivers, OS files, etc. For example, the processor 810 may trigger an upgrade process. In response to the trigger, the processor 810 may access a dictionary type data structure containing a plurality of tuples associated with the application service (and the dictionary type data structure may be uncoupled from the application service). The processor 810 may then automatically execute a search algorithm on the plurality of tuples to determine the upgrade path from a source version to a target version for the application service. According to some embodiments, the processor 810 may then automatically upgrade the application service in accordance with the determined upgrade path.

In some embodiments (such as shown in FIG. 8), the storage device 830 further stores a configmap 900. An example of a configmap 900 that may be used in connection with the apparatus 800 will now be described in detail with respect to FIG. 9. Note that the configmap 900 described herein is only one example, and additional and/or different information may be stored therein. Moreover, various files or databases might be split or combined in accordance with any of the embodiments described herein.

Figure 9:
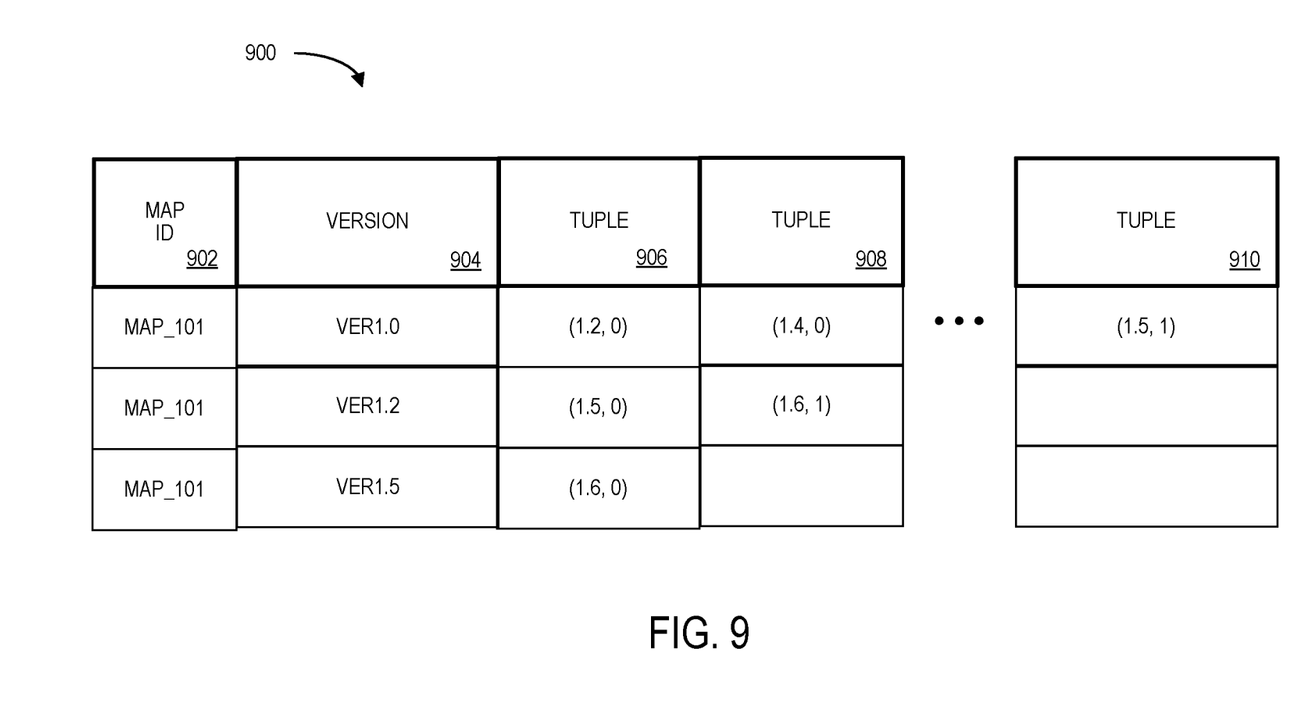
FIG. 9 is a portion of a configmap according to some embodiments.

Referring to FIG. 9, a table is shown that represents the configmap 900 that may be stored at the apparatus 800 according to some embodiments. The table may include, for example, entries identifying upgrade path information that have been recorded by the system. The table may also define fields 902, 904, 906, 908, 910 for each of the entries. The fields 902, 904, 906, 908, 910 may, according to some embodiments, specify: a map identifier 902, a version 904, and tuples 906, 908, 910. The configmap 900 may be created and updated, for example, based on information received from an operator or administrator.

The map identifier 902 may be, for example, a unique alphanumeric code identifying an upgrade path map. The version 904 might be associated with a software version identifier for an application service. The tuples 906, 908, 910 may indicate a software version upgrade identifier along with an indication of whether additional tasks need to be performed in connection with the upgrade process. Note that the configmap 900 may bind configuration files, command-line arguments, environment variables, port numbers, and other configuration artifacts to a pod container and system components at runtime. The configmap 900 may separate configurations from the pods and components, which can help keep the workloads portable, make configurations easier to change and manage, and prevent hardcoding configuration data with pod specifications. In general, the configmap 900 may be used to store and share non-sensitive, unencrypted configuration information (such as upgrade path data).

In this way, embodiments may decouple an operator and service from managing upgrade paths. As a result, separate compilation and deployment of the operator may not be necessary. If multiple versions do not exist at the same time, this approach can be used. If only one or two versions may exist at a single time, then the map can be pruned periodically to keep it small and efficient. Moreover, an operator only needs to implement a BFS search algorithm (which is a standard graph traversal technique) and other implementation logic can reside within the images. The solution is generic enough to be applied with respect any service/application where version upgrades are not trivial.

Figure 10:
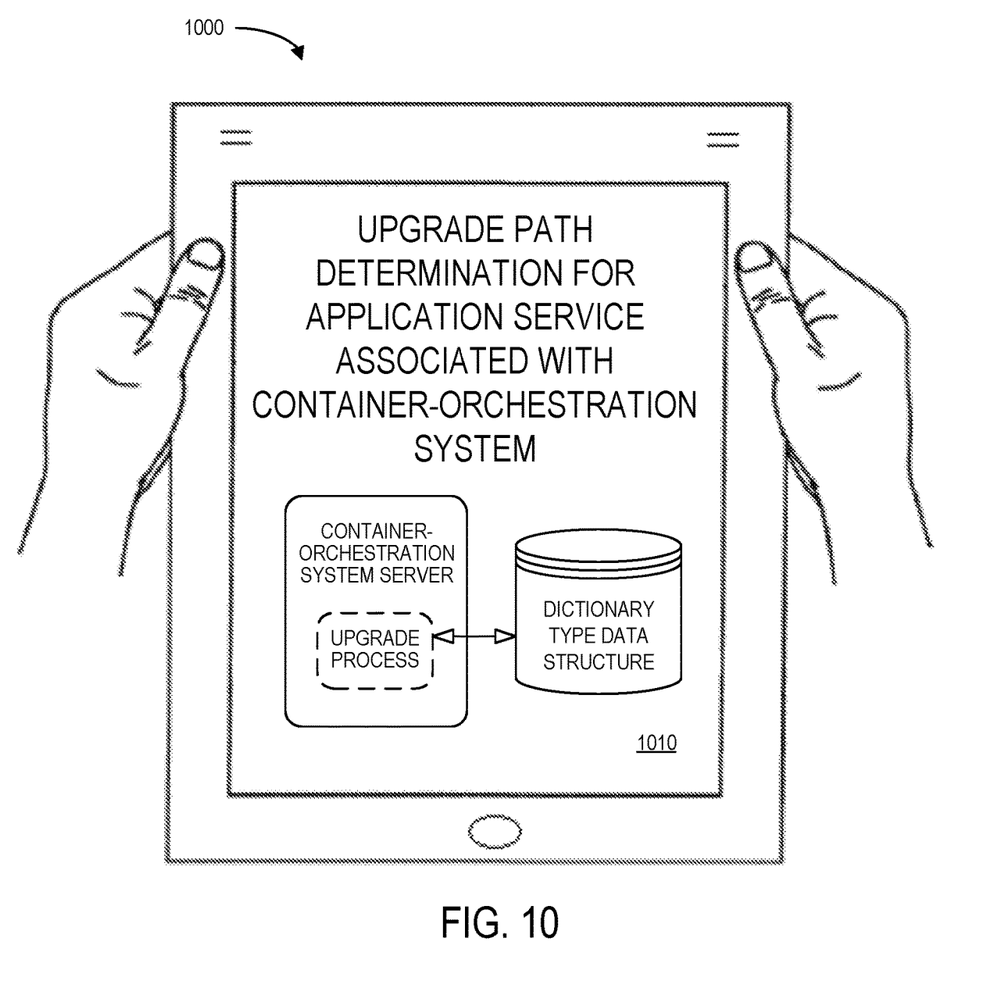
FIG. 10 illustrates a handheld tablet computer in accordance with some embodiments.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may comprise any number of hardware and/or software elements suitable to provide the functions described herein as well as any other functions. For example, any computing device used in an implementation of the discussed architectures may include a processor to execute program code such that the computing device operates as described herein. Moreover, the displays described are provided only as examples and other types of displays might be implemented. For example, FIG. 10 shows a handheld tablet computer 1000 in accordance with some embodiments. A display 1010 might provide information about software upgrade path determinations for a container-orchestration system and one or more icons may be selected by the user to adjust operation of the system (e.g., by initiating an upgrade process, inspecting a configmap, etc.).

All systems and processes discussed herein may be embodied in program code stored on one or more non-transitory tangible computer-readable media. Such media may include, for example, a floppy disk, a CD-ROM, a DVD-ROM, a Flash drive, magnetic tape, and solid-state RAM or ROM storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system to determine an upgrade path for an application service associated with a container-orchestration system and a volume mounted within a container comprising an operator object and an associated service object, comprising:
    a container-orchestration system server including a processor and instructions adapted to:
        (i) trigger, by the operator object deployed as a controller for the application service, an upgrade process,
        (ii) in response to the trigger, access a dictionary type data structure uncoupled from the application service and comprising a configmap, within the volume, that defines a tree structure, the configmap including entries for each of a plurality of application service versions, each entry having an array with a set of tuples, each tuple containing only:
            (1) a subsequent application service version to which it is possible to upgrade from the application service version of the entry, and
            (2) a Boolean value indicating if an additional task needs to be performed in connection with the upgrade process, and
        (iii) automatically execute a breadth-first search algorithm on the tree structure to determine the upgrade path from a source version to a target version for the application service.

2. The system of claim 1, wherein the container-orchestration system is further adapted to:
    (iv) automatically upgrade the application service in accordance with the determined upgrade path.

3. The system of claim 1, wherein the application service is associated with a backing service instance.

4. The system of claim 3, wherein the application service is associated with at least one of: (i) a database service, (ii) an outbound email service, (iii) a simple storage service, and (iv) a social networking service.

5. The system of claim 1, wherein the subsequent application service version to which it is possible to upgrade from the application service version in each tuple in the configmap comprises a target version identifier.

6. A method to determine an upgrade path for an application associated with a container-orchestration system and a volume mounted within a container comprising an operator object and an associated service object, comprising:
    triggering, by a container-orchestration system server in connection with an operator object deployed as a controller for the application service, an upgrade process;
    in response to the trigger, accessing a dictionary type data structure uncoupled from the application service and comprising a configmap, within the volume, that defines a tree structure, the configmap including entries for each of a plurality of application service versions, each entry having an array with a set of tuples, each tuple containing only:
        (1) a subsequent application service version to which it is possible to upgrade from the application service version of the entry, and
        (2) a Boolean value indicating if an additional task needs to be performed in connection with the upgrade process; and
    automatically executing a breadth-first search algorithm on the tree structure to determine the upgrade path from a source version to a target version for the application service.

7. The method of claim 6, further comprising:
    automatically upgrading the application service in accordance with the determined upgrade path.

8. The method of claim 6, wherein the application service is associated with a backing service instance.

9. The method of claim 8, wherein the application service is associated with at least one of: (i) a database service, (ii) an outbound email service, (iii) a simple storage service, and (iv) a social networking service.

10. The method of claim 6, wherein the subsequent application service version to which it is possible to upgrade from the application service version in each tuple in the configmap comprises a target version identifier.

11. A non-transitory, computer-readable medium storing program code, the program code executable by a computer processor to cause the processor to perform a method to determine an upgrade path for an application associated with a container-orchestration system and a volume mounted within a container comprising an operator object and an associated service object, the method comprising:
    triggering, by a container-orchestration system server in connection with an operator object deployed as a controller for the application service, an upgrade process;
    in response to the trigger, accessing a dictionary type data structure uncoupled from the application service and comprising a configmap, within the volume, that defines a tree structure, the configmap including entries for each of a plurality of application service versions, each entry having an array with a set of tuples, each tuple containing only:
        (1) a subsequent application service version to which it is possible to upgrade from the application service version of the entry, and
        (2) a Boolean value indicating if an additional task needs to be performed in connection with the upgrade process;

automatically executing a breadth-first search algorithm on the tree structure to determine the upgrade path from a source version to a target version for the application service; and automatically upgrading the application service in accordance with the determined upgrade path.

12. The medium of claim 11, wherein the application service is associated with a backing service instance representing at least one of: (i) a database service, (ii) an outbound email service, (iii) a simple storage service, and (iv) a social networking service.

13. The medium of claim 12, wherein the subsequent application service version to which it is possible to upgrade from the application service version of the entry in each tuple in the configmap comprises a target version identifier.

* * * * *